(12) United States Patent
Nou

(10) Patent No.: US 7,782,356 B2
(45) Date of Patent: Aug. 24, 2010

(54) VIDEO COMMUNICATION SYSTEM AND METHOD USING TELEMATICS SYSTEM

(75) Inventor: Seong Taeg Nou, Icheon-shi (KR)

(73) Assignee: Hyundai Autonet Co., Ltd., Incheon-Si, Gyeonggi-Do (KR)

( * ) Notice: Subject to any disclaimer, the term of this patent is extended or adjusted under 35 U.S.C. 154(b) by 1372 days.

(21) Appl. No.: 11/162,756

(22) Filed: Sep. 21, 2005

(65) Prior Publication Data

US 2006/0146131 A1 Jul. 6, 2006

(30) Foreign Application Priority Data

Dec. 20, 2004 (KR) ...................... 10-2004-0108950

(51) Int. Cl.
*H04N 7/14* (2006.01)
*H04N 5/232* (2006.01)
(52) U.S. Cl. ............ 348/14.01; 348/14.02; 348/211.12; 348/211.1
(58) Field of Classification Search .............. 348/14.01, 348/14.02, 14.03, 113, 14.04, 14.1, 211.12, 348/211.1; 726/29; 705/43, 42; 370/338, 370/401; 455/419, 566, 3.06, 414.1, 414.3, 455/415, 422.1, 446, 517, 557, 3.01, 3.04, 455/420, 550.1, 432.3, 434, 452.1, 456.3, 455/515, 565, 556.2; 379/100.01, 101.01, 379/266.01
See application file for complete search history.

(56) References Cited

U.S. PATENT DOCUMENTS 5,758,079 A * 5/1998 Ludwig et al. .............. 709/204

| | | | |
|---|---|---|---|
| 7,099,288 B1 * | 8/2006 | Parker et al. ................. 370/259 |
| 7,269,415 B2 * | 9/2007 | Bostrom et al. ............. 455/419 |
| 2005/0088513 A1 * | 4/2005 | Oswald et al. ........... 348/14.02 |
| 2005/0183115 A1 * | 8/2005 | Maruyama et al. ............ 725/38 |
| 2006/0004660 A1 * | 1/2006 | Pranger ....................... 705/43 |
| 2006/0130151 A1 * | 6/2006 | Wu .............................. 726/29 |
| 2007/0002128 A1 * | 1/2007 | Sawada ................... 348/14.01 |
| 2007/0110009 A1 * | 5/2007 | Bachmann et al. .......... 370/338 |

FOREIGN PATENT DOCUMENTS

| JP | 2004-085308 | 3/2004 |
|---|---|---|
| KR | 1997-7009 | 5/1997 |
| KR | 1020040035290 | 4/2004 |
| KR | 1020040035295 | 4/2004 |
| KR | 1020040035297 | 4/2004 |
| KR | 1020040033101 | 10/2004 |

* cited by examiner

*Primary Examiner*—Jerome Grant, II
(74) *Attorney, Agent, or Firm*—IPLA P.A.; James E. Bame

(57) ABSTRACT

A video communication system and method for allowing a video communication using a telematics system is provided. The video communication system includes a telematics terminal for transmitting a video communication request signal, capturing image and voice, and receiving video communication data; a service providing center for receiving the video communication request signal, detecting the telematics terminal inherent number from the received video communication request signal, and detecting the corresponding other party's mobile communication terminal inherent number and forming a video communication path with a mobile communication terminal; and the mobile communication terminal having a display unit displaying an image, and performing a video communication with the telematics terminal.

11 Claims, 3 Drawing Sheets

VIDEO COMMUNICATION SYSTEM AND METHOD USING TELEMATICS SYSTEM

BACKGROUND OF THE INVENTION

1. Field of the Invention

The present invention relates to a telematics system, and more particularly, to a video communication system and method for allowing a video communication using a telematics system.

2. Description of the Related Art

In recent years, a telematics technology is one of technologies attracting attention. Telematics is a compound word of telecommunication and informatics, and is an integrated services system based on a car.

A telematics system detects occurrence of vehicle accident or theft, guides a vehicle running path, and provides a vehicle driver with a variety of other information using a mobile communication method and a position tracing method associated with Internet. In other words, the telematics system provides information through a vehicle based on a Global Positioning System (GPS) using a mobile communication system and a GPS satellite. Accordingly, the telematics system is expected to provide a variety of mobile communication services, such as position information, traffic information, countermeasure to an emergency situation, remote vehicle diagnosis, the use of Internet (for example, financial transaction, provision of news, and transmission and reception of e-mail), using the GPS, a wireless communication network and an Internet network.

One of the reasons why the telematics system attracts attention is that it creates a newly conceptive value added service, which is able to maximize a synergy effect by merging an automobile industry with an Information Telecommunication (IT) industry.

Accordingly, a standardization group of telematics is provided. In the standardization group, there are being standardized an operation and a function of each constituent part of the telematics system, a communication protocol between the constituent parts, and services using a communication network.

If a telematics service is realized, a car can be reconstructed through a wire or wireless communication and broadcasting network, using Internet, which is a third space following an office space and a home space, and can be associated with home networking and office automation through a hetero communication and broadcasting network and an intelligent terminal, thereby providing a service for home and office even to the car without interruption.

Together with the spotlight of a telematics technology and the development of the telematics system, a variety of service contents satisfying a user's desire are being required.

SUMMARY OF THE INVENTION

Accordingly, the present invention is directed to a video communication system and method using a telematics system that substantially overcomes one or more of the limitations and disadvantages of the conventional art.

One object of the present invention is to provide a video communication system and method for allowing a video communication using a telematics system.

Another object of the present invention is to provide a video communication system and method for allowing a video communication while displaying necessary data together with an image using a telematics system, thereby enabling a smooth communication.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a video communication system using a telematics system, the system including: a telematics terminal for transmitting a video communication request signal that has a predetermined inherent number and the other party's mobile communication terminal inherent number, capturing image and voice to generate and transmit video communication data when a video communication path is formed in response to the video communication request signal, and receiving video communication data to separate the received video communication data into image and voice; a service providing center for storing information on whether or not to subscribe to a video communication service, and a telematics terminal inherent number for a video communication service subscriber, receiving the video communication request signal, detecting the telematics terminal inherent number from the received video communication request signal to determine whether or not to be the video communication service subscriber, and if it is determined to be the video communication service subscriber, detecting the corresponding other party's mobile communication terminal inherent number and forming a video communication path with a mobile communication terminal; and the mobile communication terminal having a display unit displaying an image, and performing a video communication with the telematics terminal.

In another aspect of the present invention, there is provided a video communication method using a telematics system having a telematics terminal for storing an inherent number, a service providing center for storing information on whether or not to subscribe to a video communication service and a telematics terminal inherent number for a video communication service subscriber, and a mobile communication terminal for displaying an image, the method including the steps of: in the telematics terminal, transmitting a video communication request signal having the inherent number and the other party's mobile communication terminal inherent number; in the service providing center, receiving the video communication request signal, detecting the telematics terminal inherent number from the received video communication request signal to determine whether or not to be a video communication service subscriber, and if it is determined to be the video communication service subscriber, detecting the corresponding other party's mobile communication terminal inherent number and forming a video communication path with a mobile communication terminal; in the telematics terminal, when a video communication path is formed in response to the video communication request signal, capturing image and voice to generate and transmit video communication data, and receiving video communication data to separate the received video communication data into image and voice; and in the mobile communication terminal, transmitting the video communication data to the telematics terminal, and receiving the video communication data to separate the received video communication data into image and voice.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
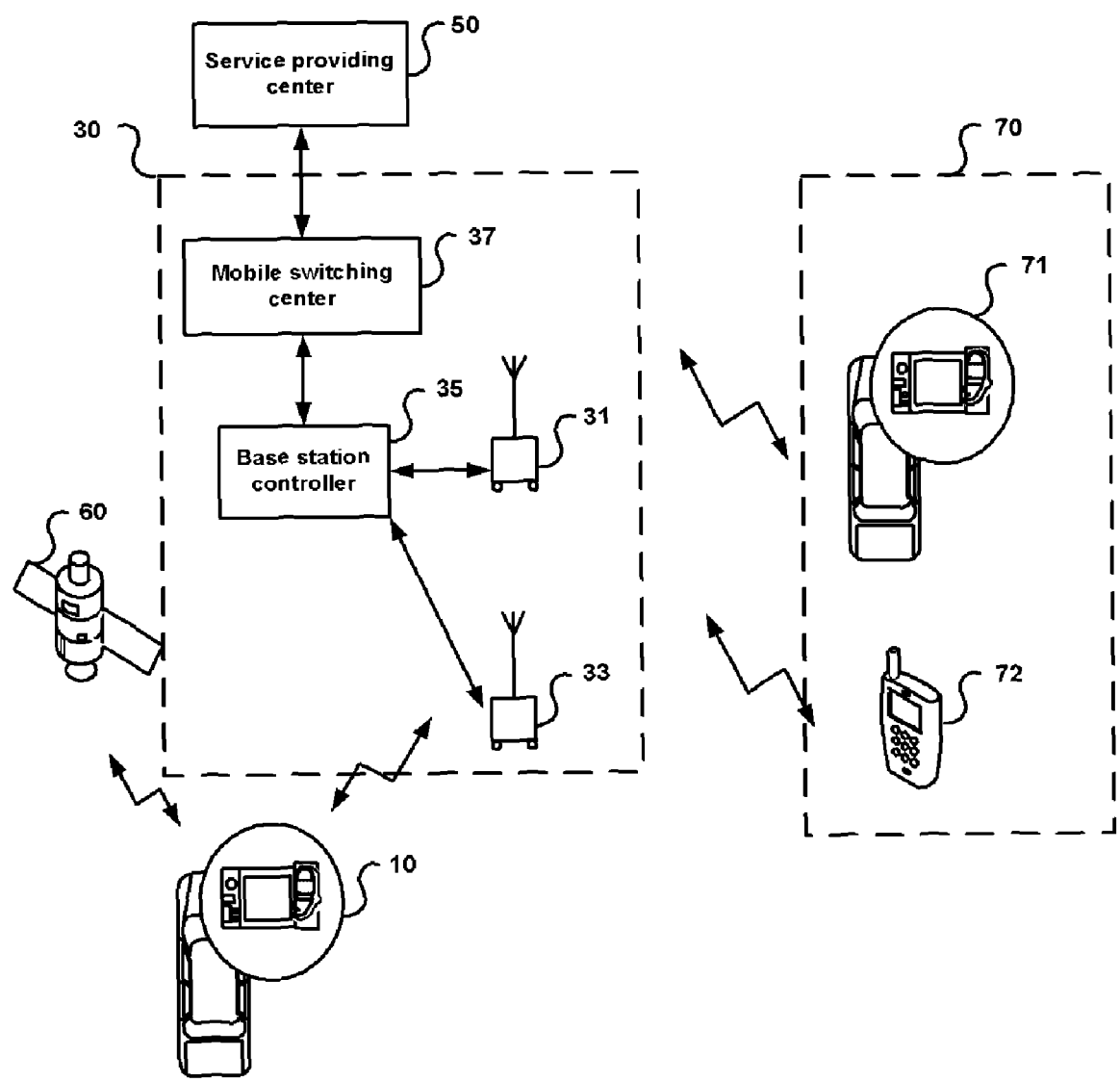
FIG. 1 illustrates a construction of a video communication system using a telematics system according to the present invention.

Reference will now be made in detail to the preferred embodiments of the present invention, examples of which are illustrated in the accompanying drawings. Wherever possible, the same reference numerals will be used throughout the drawings to refer to the same or like parts.

In the present invention, a video communication is performed between telematics terminals of a telematics system, or between the telematics terminal and another telematics terminal, a cellular phone or Portable Digital Assistants (PDA) connected through a mobile communication network. In the present invention, necessary data is communicated during the video communication, thereby making it possible to talk over the telephone and hold a conference while viewing the received data together with an image. Hereinafter, a description will be made with reference to the drawings.

FIG. 1 illustrates a construction of a video communication system using a telematics system according to the present invention.

The inventive video communication system includes the telematics terminal 10, a mobile communication network 30, a service providing center 50, an artificial satellite 60, and a mobile communication terminal 70.

The telematics terminal 10 receives position information from the artificial satellite 60, maps the received position information to a previously stored map data, and displays a car's position on a displaying device such as a Liquid Crystal Display (LCD). Further, even when the telematics terminal 10 receives a position track request signal from the service providing center 50 through the mobile communication network 30, it detects its position and generates position information to transmit the generated position information to the service providing center 50 through the mobile communication network 30. The telematics terminal 10 can be connected with the mobile communication network 30 using the mobile communication terminal 70, or can be also connected with the mobile communication network 30 using its internally installed wireless communication unit 170. Through the telematics terminal 10, a telematics system subscriber can receive a service for providing traffic information through the mobile communication network 30, displaying the provided traffic information on the LCD, and providing current traffic situation information in video. Further, the telematics terminal 10 diagnoses a vehicle status, and informs a user, who is far away from a vehicle, of the diagnosed vehicle status through the telematics system.

Since the telematics terminal 10 connects to the mobile communication network 30 to receive the service, it can employ technologies of EVolution Data Only (Optimize) (EVDO), Wideband Code Division Multiple Access (WCDMA), and EVolution Data and Voice (EV-DV) that are being applied to a mobile communication system. Accordingly, in the present invention, the technologies can be used to transmit an image captured through a camera of the telematics terminal 10, to the mobile communication terminal 70. Further, the telematics terminal 10 can receive an image signal from the mobile communication terminal 70, and display the received image signal on the display device. Hereinafter, the image signal generated in the service of a video communication or a video conference is called "video signal".

The service providing center 50 is connected with the mobile communication network 30. The service providing center 50 is wireless connected with the telematics terminal 10 through the mobile communication network 30 to receive the video signal from the telematics terminal 10 and transmit the received video signal to the mobile communication terminal 70 through the mobile communication network 30. The service providing center 50 should hold an inherent number of the telematics terminal 10 for each video communication or conference service subscriber to perform a subscriber authentication and connect to the corresponding telematics terminal 10.

If the service providing center 50 receives a video communication request signal from the telematics terminal 10, it checks the inherent number of the telematics terminal 10 and whether or not to be a subscriber to the video communication or conference service. If it is determined to be the subscriber, the service providing center 50 requests the mobile communication network 30 to allocate a channel. At this time, the mobile communication network 30 forms a data channel and/ or a voice channel for communicating with the telematics terminal 10 upon reception of a channel allocation request.

According to the present invention, the service providing center 50 should receive and hold information on the inherent number of the telematics terminal 10 and the service subscription or not, to connect with the telematics terminal 10 through the mobile communication network 30, thereby providing the video communication or conference service.

The mobile communication terminal 70 can be a cellular phone 72 or another telematics terminal 71 connecting to the service providing center 50 through the mobile communication network 30. The mobile communication terminal 70 communicates video communication data with the telematics terminal 10, and separates the received video communication data into an image and a voice to display the image on the display device and output the voice through a speaker.

Figure 2:
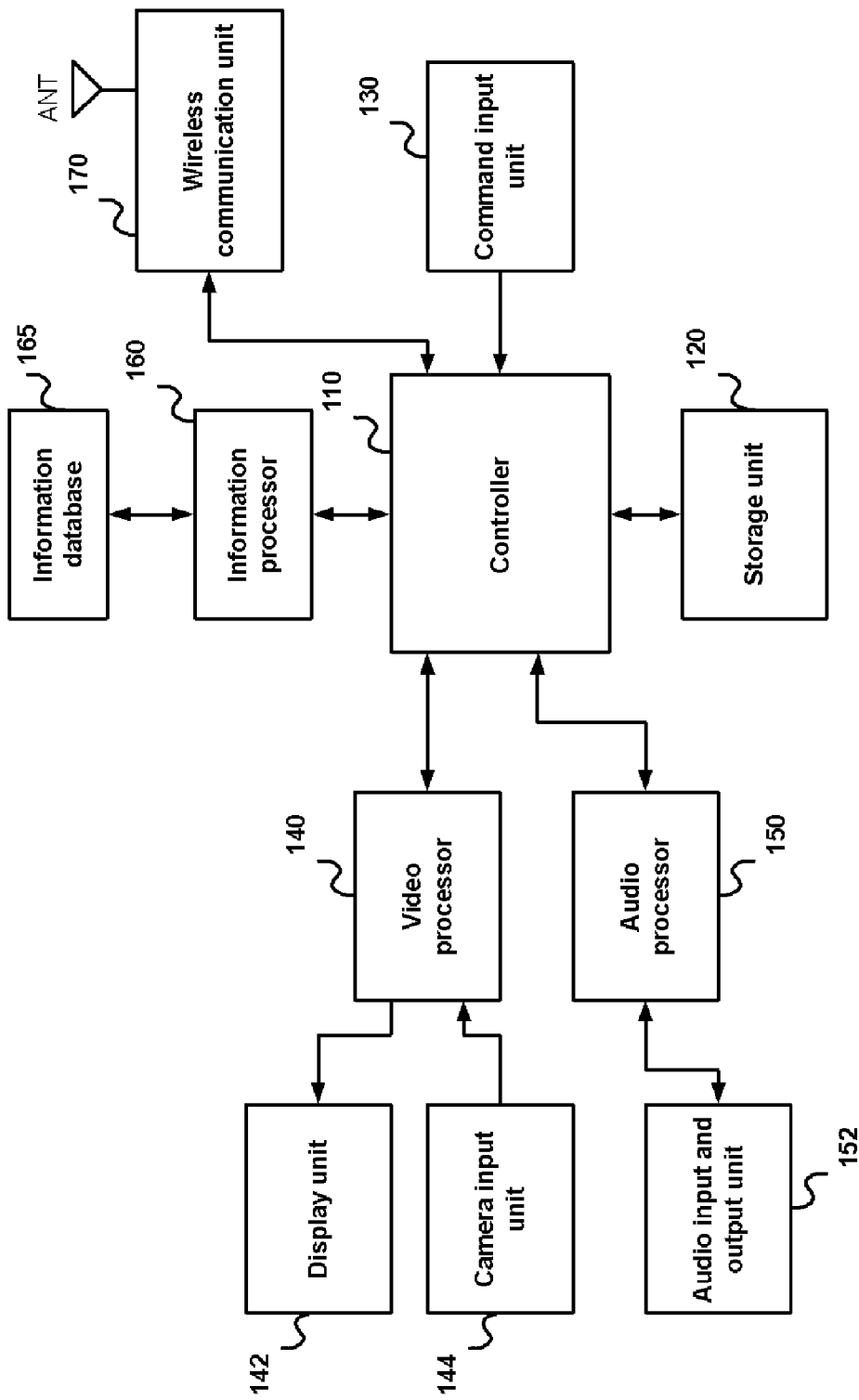
FIG. 2 illustrates a construction of a telematics terminal of a telematics system according to an embodiment of the present invention.

FIG. 2 illustrates a construction of the telematics terminal of a telematics system according to an embodiment of the present invention. It should be noted that constructions would be omitted to keep the disclosure of the invention clear and concise.

The inventive telematics terminal 10 includes a controller 110, a storage unit 120, a command input unit 130, an image processor 140, a display unit 142, a camera input unit 144, an audio processor 150, an audio input and output unit 152, an information processor 160, an information database 165, and the wireless communication unit 170.

The controller 110 includes a timer (not shown) for counting time, and controls a general operation for the video communication according to the present invention.

The storage unit 120 includes a region for storing a control program for the video communication, a region for temporarily storing data generated in execution of the control program, and a region for storing a user data generated by a user such as data information.

The command input unit 130 generates control commands, which are inputted by the user, for the video communication, and outputs the generated control commands to the controller 110. The command input unit 130 can employ a key input unit, a touch pad, and a voice recognition unit. In case where the command input unit 130 is the key input unit, the control commands can be key data generated by a key pressed. In case where the command input unit 130 is the touch pad, the control command can be a positional coordinate, which corresponds to the key data, on a touch panel. In case where the command input unit 130 is the voice recognition unit, the control command can be voice control data corresponding to the key data. Accordingly, depending on the control program of the storage unit 120 having the control information corresponding to the key data, the positional coordinate, or the voice control data, the controller 110 generates a corresponding control signal and performs a corresponding control operation.

The information database 165 stores a variety of information provided from the telematics system. For example, the information database 165 stores a variety of information such as traffic information, map information, facilities information, entertainment information, position information, vehicle information, personal information, and life information. The user data can be stored not only in the storage unit 120 but also in the information database 165. Accordingly, since a variety of information according to the telematics service is used, it is desirable that the information database 165 uses a large capacity of storage device.

Under the control of the controller 110, the information processor 160 reads desired information from the information database 165 and outputs the read information to the controller 110, and receives information from the controller 110 and stores the received information in the information database 165 on the basis of types of information.

The wireless communication unit 170 connects to the mobile communication network 30 through an antenna (ANT), and communicates voice and data with the mobile communication network 30. The data can be image data and/or voice data for the video communication. The voice can be a voice signal for the video communication or the video conference. In other words, the wireless communication unit 170 can form only the data channel with the mobile communication network 30 for the video communication, and communicate all of the image data and the voice data through the data channel. Further, the wireless communication unit 170 can form all of the data channel and the voice channel, and communicate the image data and the voice data through the data channel and the voice channel, respectively.

Under the control of the controller 110, the video processor 140 receives the image data through the wireless communication unit 170, processes the received image data, and displays the processed image data on the display unit 142. The video processor 140 receives the captured video signal from the camera input unit 144, processes the received video signal, and transmits the processed video signal to the mobile communication network 30 through the wireless communication unit 170.

Under the control of the controller 110, the audio processor 150 receives the voice data through the wireless communication unit 170, processes the received voice data, and outputs the processed voice data to the audio input and output unit 152. The audio processor 150 receives the voice signal from the audio input and output unit 152, processes the received voice signal, and outputs the processed voice signal to the controller 110. The audio input and output unit 152 can be comprised of the speaker and a microphone.

Figure 3:
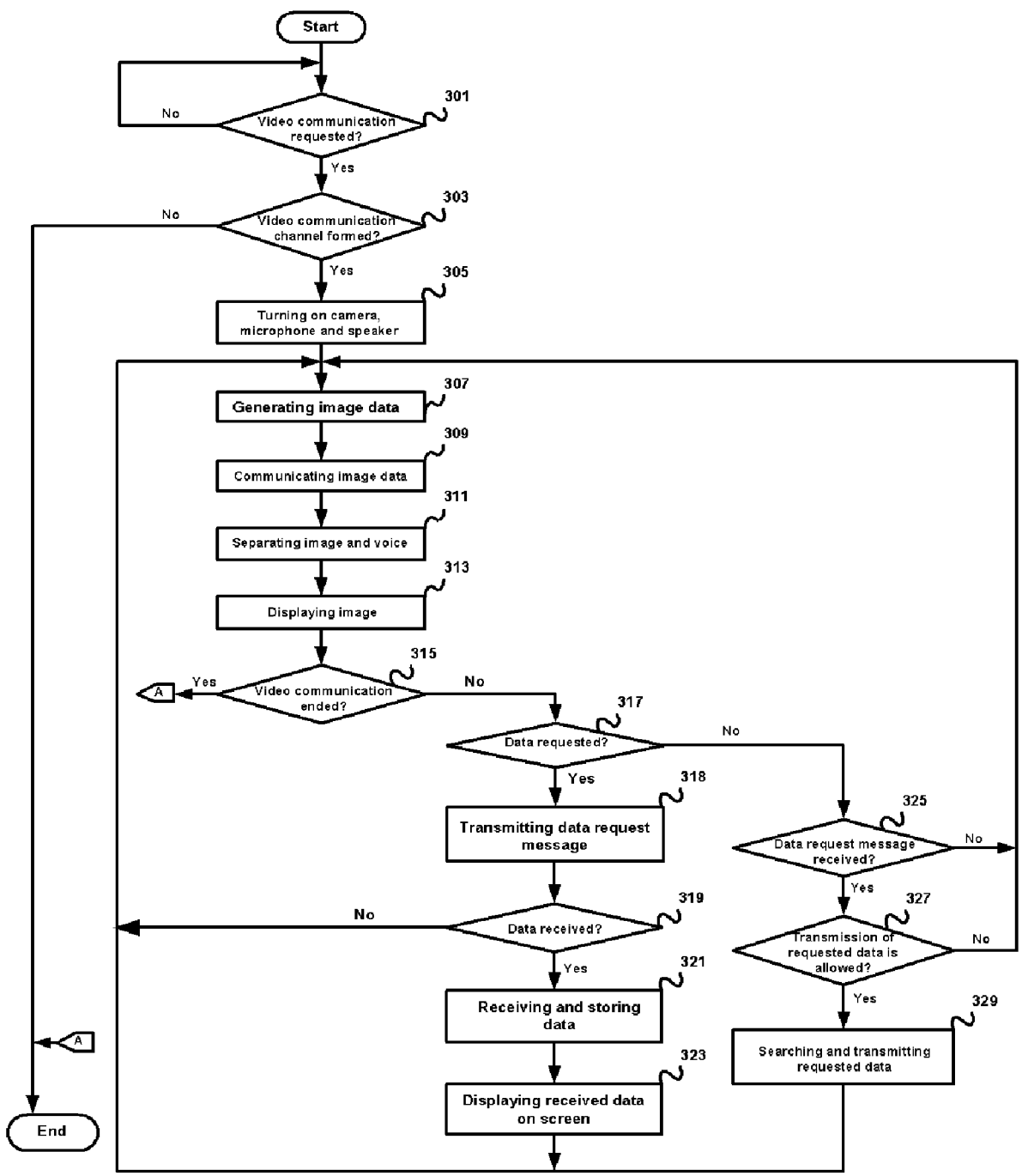
FIG. 3 is a flowchart illustrating a video communication method in a telematics terminal according to an embodiment of the present invention.

FIG. 3 is a flowchart illustrating a video communication method in the telematics terminal according to an embodiment of the present invention. A description of the video communication method will be made below with reference to FIGS. 1 to 3.

First, the controller 110 of in the telematics terminal 10 determines whether or not a video communication command is inputted through the command input unit 130 in Step 301. If it is determined that the video communication command is inputted in the Step 301, the controller 110 connects with the mobile communication network 30, and transmits a video communication request message for forming the video communication channel, to the service providing center 50 through the mobile communication network 30. The video communication request message should include an inherent telephone number of the telematics terminal 10. Upon reception of the video communication request message, the service providing center 50 detects the inherent telephone number of the video communication request message, and determines whether or not a subscriber corresponding to the inherent telephone number subscribes to the video communication service. If it is determined to subscribe to the video communication service, the service providing center 50 transmits an incoming call to the mobile communication terminal 70 that the telematics terminal 10 has requested for the video communication. Upon reception of a response signal from the mobile communication terminal 70 in response to the incoming call, the service providing center 50 requests the mobile communication network 30 to allocate the channel. Thus, the mobile communication network 30 forms the data channel with the telematics terminal 10 for the video communication, or allocates the data channel and the voice channel to form a video communication path.

The service providing center 50 requests the mobile communication network 30 to allocate the data channel and the voice channel to the telematics terminal 71 in the same manner. If so, the mobile communication network 30 allocates the data channel and the voice channel to the telematics terminal 71, and forms a video communication path between the telematics terminal 10 and the telematics terminal 71. A case where the image data and the voice data are all communicated through the data channel will be described below.

If it is determined not to subscribe to the video communication service, the service providing center 50 transmits a non-subscriber notification message to the telematics terminal 10 through the mobile communication network 30.

After requesting the video communication, the controller 110 determines whether or not the video communication path is formed in Step 303. At this time, upon reception of the non-subscriber notification message, the controller 110 ends the video communication. If it is determined that the video communication path is formed in the Step 303, a camera, the microphone and the speaker are turned on in Step 305. After that, in Step 307, the video signal obtained through the camera input unit 144 is processed in the video processor 140, and then the image data to be transmitted to the mobile communication network 30 is continuously outputted to the controller 110. The video signal inputted through the audio input and output unit 152 is converted into the voice data in the audio processor 150, and outputted to the controller 110. In Step 309, the controller 110 receives the image data and the voice data, generates the video communication data, transmits the generated video communication data through the wireless communication unit 170, and receives video communication data from the corresponding mobile communication terminal 70 through the wireless communication unit 170. In Step 311, the received video communication data is separated into the image data and the voice data. In Step 313, the image data is displayed on the display unit 142 through the video processor 140, and the voice data is outputted in voice through the audio processor 150 and the audio input and output unit 152. At this time, the controller 110 can control the video processor 140 to display not only the received image data but also an image inputted from the camera input unit 144, on the display unit 142. That is, the display unit 142 can be bi-partitioned to display all images of both transmitting and receiving sides.

If the image and the voice are outputted and the video communication is initiated, the controller 110 determines whether or not a video communication end command or a data request command is inputted from the command input unit 130 in Steps 315 and 317. In Step 325, it is determined whether or not a data request message is received from the other party's mobile communication terminal 70.

If the communication end command is inputted in the Step 315, the controller 110 ends the video communication. If the data request command is inputted in the Step 317, the data request message is transmitted to the other party's mobile communication terminal 70 in Step 318. After that, the controller 110 determines whether or not data is received in response to the data request message in Step 319. If it is determined that the data is received in Step 319, the controller 110 stores the received data in the storage unit 20 or the information database 165 in Step 321. After that, the controller 110 displays the received data on a screen where its own image is displayed, among bi-partitioned screens of the display unit 142, so that the received data together with the other party's image is displayed on the display unit 142.

Whereas, upon reception of the data request message from the other party's mobile communication terminal 70 in the Step 325, the controller 110 determines whether or not a data transmission command for allowing the transmission of the requested data is inputted from the command input unit 130 in Step 327. If so, the controller 110 searches for the corresponding data and transmits the searched data through the wireless communication unit 170 in Step 329. The data can be transmitted in such a predetermined format that the data is inserted into the video communication data, or can be transmitted using a separate data channel further allocated, or can be transmitted through a control channel that is set when wireless connection is made between the mobile communication network 30 and the telematics terminal 10 or the cellular phone 72.

The above process is repeated to provide the video communication until the video communication end command is inputted in the Step 315.

The above description is for only a case where the data is received and displayed, but at the receiving side, additional items can be also added to the data, and again transmitted. For example, in case of approval papers, an approval signature is added and transmitted. In this case, it is desirable to use the touch pad. In case where the key input unit is used, approval can be made in such a manner that an approval signature image is previously stored and combined. Further, only an item added to the data can be transmitted to the other party.

As described above, in the present invention, owing to the video communication performed through the telematics terminal installed at the vehicle, works that should be confirmed with naked eyes while being processed at an on-spot site can be processed even within the remote vehicle and accordingly, there is an advantage of providing the user with mobility.

Further, in the present invention, necessary data, for example, text data is displayed at one side of the display unit in the video communication and accordingly, there is an advantage of greater facilitating the other party's understanding.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A video communication system using a telematics system, the system comprising:
 a telematics terminal for transmitting a video communication request signal that has a predetermined inherent number and the other party's mobile communication terminal inherent number, capturing image and voice to generate and transmit video communication data when a video communication path is formed in response to the video communication request signal, and receiving video communication data to separate the received video communication data into image and voice;
 a service providing center for storing information on whether or not to subscribe to a video communication service, and a telematics terminal inherent number for a video communication service subscriber, receiving the video communication request signal, detecting the telematics terminal inherent number from the received video communication request signal to determine whether or not to be the video communication service subscriber, and if it is determined to be the video communication service subscriber, detecting the corresponding other party's mobile communication terminal inherent number and forming a video communication path with a mobile communication terminal; and
 the mobile communication terminal having a display unit displaying an image, and performing a video communication with the telematics terminal.

2. The system according to claim 1, wherein when the telematics terminal requests data, the mobile communication terminal transmits a previously stored data to the telematics terminal.

3. The system according to claim 2, wherein the data is displayed, together with the other party's image, on the display unit of the telematics terminal.

4. The system according to claim 3, wherein the display unit is vertically bi-partitioned so that the other party's image is displayed at one side and the data is displayed at the other side.

5. The system according to claim 1, wherein when the mobile communication terminal transmits the data, the telematics terminal receives and stores the data.

6. The system according to claim 5, wherein the data is displayed, together with the other party's image, on the display unit of the telematics terminal.

7. The system according to claim 6, wherein the display unit is vertically bi-partitioned so that the other party's image is displayed at one side and the data is displayed at the other side.

8. A video communication method using a telematics system having a telematics terminal for storing an inherent number, a service providing center for storing information on whether or not to subscribe to a video communication service and a telematics terminal inherent number for a video communication service subscriber, and a mobile communication terminal for displaying an image, the method comprising the steps of:

in the telematics terminal, transmitting a video communication request signal having the inherent number and the other party's mobile communication terminal inherent number;

in the service providing center, receiving the video communication request signal, detecting the telematics terminal inherent number from the received video communication request signal to determine whether or not to be a video communication service subscriber, and if it is determined to be the video communication service subscriber, detecting the corresponding other party's mobile communication terminal inherent number and forming a video communication path with a mobile communication terminal;

in the telematics terminal, when a video communication path is formed in response to the video communication request signal, capturing image and voice to generate and transmit video communication data, and receiving video communication data to separate the received video communication data into image and voice; and in the mobile communication terminal, transmitting the video communication data to the telematics terminal, and receiving the video communication data to separate the received video communication data into image and voice.

9. The method according to claim 8, further comprising the step of requesting data in the telematics terminal, and transmitting a previously set data from the mobile communication terminal to the telematics terminal in response to the data request.

10. The method according to claim 9, wherein the telematics terminal displays the received data together with the other party's image.

11. The method according to claim 8, wherein when the mobile communication terminal requests the telematics terminal to receive data, the telematics terminal receives and stores the data and displays the data together with the other party's image.

* * * * *